United States Patent [19]

Ra mahers

[11] Patent Number: 4,973,991

[45] Date of Patent: Nov. 27, 1990

[54] CLAMPING ROLLER FOR A SHEET MEDIUM

[75] Inventor: Johannes H. M. Raijmahers, Afferden, Netherlands

[73] Assignee: Stork X-Cel B.V., Netherlands

[21] Appl. No.: 352,556

[22] Filed: May 16, 1989

[30] Foreign Application Priority Data

May 18, 1988 [NL] Netherlands ........................ 8801284

[51] Int. Cl.[5] ..................... G01D 15/26; G03G 15/00; H04N 1/04; B65H 5/02

[52] U.S. Cl. .................................... 346/138; 355/312; 358/492; 271/275

[58] Field of Search ............................... 346/136, 138; 106/415.1; 271/277, 275; 355/30 R; 358/291, 492

[56] References Cited

U.S. PATENT DOCUMENTS 4,517,575 5/1985 Kakimoto et al. .................. 346/138

FOREIGN PATENT DOCUMENTS 0048826 4/1982 European Pat. Off. .
3225593 3/1983 Fed. Rep. of Germany .
2234136 1/1975 France .
57-99673 6/1982 Japan .
7111806 3/1973 Netherlands .
7213566 4/1973 Netherlands .

*Primary Examiner*—George H. Miller, Jr.
*Assistant Examiner*—Gerald E. Preston
*Attorney, Agent, or Firm*—Lucas & Just

[57] ABSTRACT

A drum used as a clamping roller for mounting a substrate, such as a sheet of paper, in a device in which the surface of said substrate is treated.

The clamping roller is of use in a device such as an electrojet printer. The roller comprises a thin metal seamless sleeve having perforations; a coating is present on the sleeve having such form that a great variety of substrate formats may be held on the roller surface by creating a low vacuum inside the sleeve.

For all formats the coating is of similar form.

The thin sleeve is centered around the roller's axis by means of centering means having the form of end-discs.

4 Claims, 3 Drawing Sheets

CLAMPING ROLLER FOR A SHEET MEDIUM

BACKGROUND OF THE INVENTION

The invention relates to a clamping roller for a sheet-like medium, comprising a shaft and a cylindrical element set up centered round the shaft, the surface of said element being provided with perforations for holding said medium through suction.

Such clamping rollers are commonly used in those cases in which a sheet-like medium has to be photographically exposed or printed using contactless printing devices such as an ink jet printer.

Such clamping rollers are generally of relatively heavy design, with the result that high strength standards are required of the structure in which such a roller is accommodated. The mass inertia of such rollers is also great, so that during starting up and slowing down thereof considerable time is required to reach the desired end position, and a relatively heavy motor is needed.

This great mass of such clamping rollers is therefore a disadvantage; the object of the present invention is to provide a solution to the above-mentioned disadvantage.

SUMMARY OF THE INVENTION

The clamping roller of the above-mentioned type is to this end, according to the invention, characterized in that the cylindrical element comprises a thin-walled, seamless perforated metal sleeve, and means are present for centering the sleeve around the shaft.

It was in fact found that for clamping purposes such a thin-walled metal sleeve provided with perforations is extremely suitable for the purpose, provided that means are present for centering the roller correctly around the shaft.

In particular, the metal sleeve used in the clamping roller according to the invention is provided with a patterned cover, leaving clear surface parts which have at least one perforation.

In fact, it was found that for the correct positioning of sheet-like medium, for example a sheet of paper, it is not necessary to leave all perforations of the sleeve free, but that by forming a suitable covering pattern, the metal sleeve used can be for clamping all formats of sheet-like medium up to the format which is the maximum that can be accommodated by a particular sleeve.

The above-mentioned covering is expediently formed in such a way that the format of the largest continuous surface part of the sleeve left clear corresponds essentially to the format of the smallest sheet-like medium to be clamped.

Surprisingly, it was in fact found that an adequate suction of all formats of sheet-like materials to be clamped is obtained if it is ensured that the perforations of the sleeve used are uncovered over an area which corresponds to the dimensions of the smallest format to be clamped, while in the remaining surface of the sleeve the covering is only locally provided with cut-outs, which are, however, of such dimensions that they have at least one perforation. If such a clamping roller is employed, use can be made according to the invention of a low-capacity, constant-output fan for creating the desired vacuum.

In the drawing which follows the surface division of the covering of the sleeve will be discussed in greater detail.

The covering on the sleeve can be applied in many ways; an efficient method is characterized in that the covering is formed by coating the sleeve with a layer of a light-sensitive composition, pattern-wise exposure of the layer is carried out with radiation of a suitable wavelength, development of the layer with a developing fluid to remove the soluble parts of the layer and, if necessary, hardening of the patterned covering thus formed.

Advantageously, the means, for centering the metal sleeve used are means which can center it, under axial tension if desired, relative to the shaft of the clamping roller, and these centering means are preferably end discs to which the sleeve is connected, and where one or more apertures are disposed at least in one end disc and can connect to means for the discharge of gas, in order to take the interior of the clamping roller to a pressure lower than atmospheric pressure and maintain it at that pressure.

The end discs used, to which the sleeve is connected, for example by bonding or in another way, are fixed to the shaft to be used. An axial tensile force can be exerted on the sleeve accommodated between the end discs if necessary. Such a tension applied provides the thin-walled metal sleeve with additional stability. For practical purposes, the indentation in the sleeve arising from a vacuum inside the sleeve is negligible.

The vacuum in the sleeve can be produced in many ways; in an attractive method the means for discharge of gas can connect by means of a stationary sleeve with little play to one of the two end discs in such a way that free rotation of the clamping roller is permitted.

In a preferred embodiment of the clamping roller according to the invention the metal sleeve used is a seamless nickel screen printing stencil with a wall thickness of approximately 400 μm, a fineness of approximately 22 mesh (22 holes per linear inch = 25.4 mm) and an open surface of approximately 40%.

The invention also relates to an ink jet device, comprising a unit for programmed forming, charging and selective collection of droplets of a printing medium, and a clamping roller for accommodating a sheet-like medium for printing using the ink jet printing device, and also means for setting the roller in rotation and programmed movement of the ink jet printing device relative to the rotating clamping roller, which is characterized in that the clamping roller is a clamping roller according to the invention as described above.

BRIEF DESCRIPTION OF THE DRAWING

The invention will now be explained with reference to the drawing, in which.

FIGS. *3a* and *3b* shows partial views of an end disc of the type used in a clamping roller according to the invention.

Figure 1:
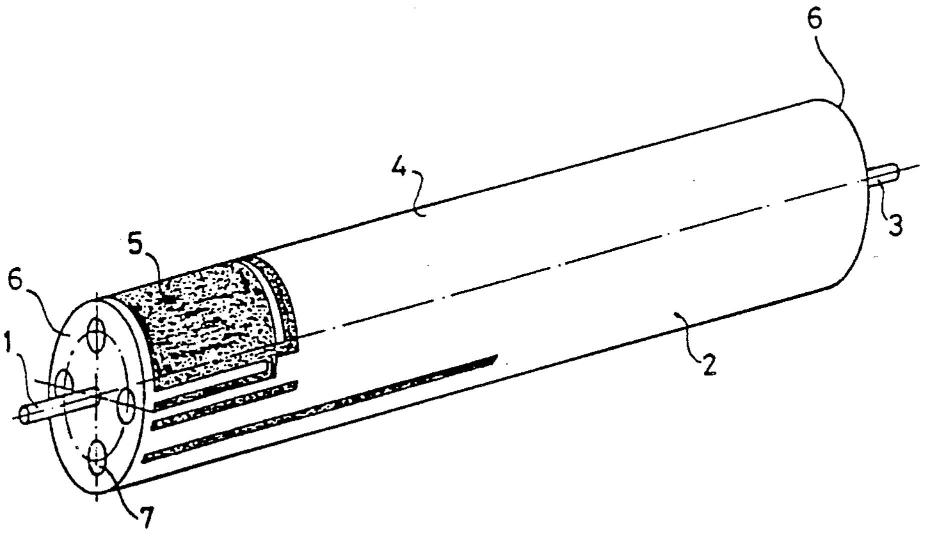
FIG. 1 is an isomeric view of a clamping roller according to the invention.

FIG. 1 shows a clamping roller 1, comprising a metal sleeve 2, a shaft 3, end discs 6 and apertures 7 in said end discs. The sleeve is provided with a covering 4 in which parts 5 are left uncovered. It is pointed out that uncovered places are also present in the part 4, as will be indicated further in FIG. 2 which follows. The partial covering outlined here makes it possible to clamp paper formats which in terms of size lie between the dimension of the largest uncovered part 5 and the full surface of the sleeve 2.

Figure 2:
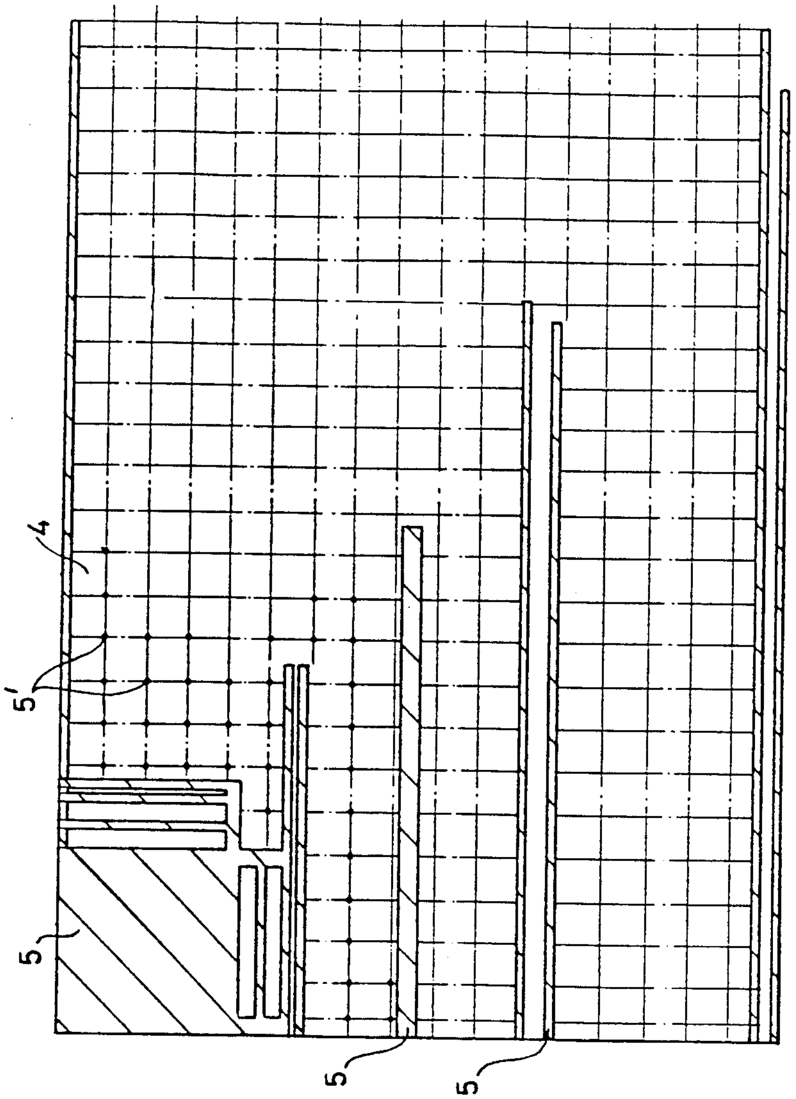
FIG. 2 shows schematically a covering pattern on a sleeve which is shown in section.

FIG. 2 shows a covering pattern on the sleeve in section; the parts with slanting hatching are completely clear of covering. The parts 5 not covered also comprise the uncovered parts 5' which are, however, small in area, but are such that at least one perforation of the underlying perforated sleeve falls therein.

In this Figure the part 5 which has the largest dimension corresponds roughly to an A4 format, while the total surface area of the sleeve corresponds essentially to an A0 format.

In a typical embodiment of a sleeve used, the wall thickness thereof is 400 μm, the fineness is 22 mesh, which means 22 holes per linear 25.4 mm, and the open surface of the sleeve used is approximately 40%. The sleeve had a length of 1,200 mm and a circumference of 1,018 mm, and was made of electrolytically deposited nickel.

The parts 5' not covered are circular, with a diameter of 5 mm.

Figure 3B:
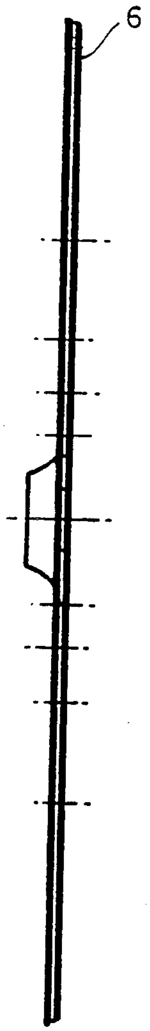
Figure 3A:
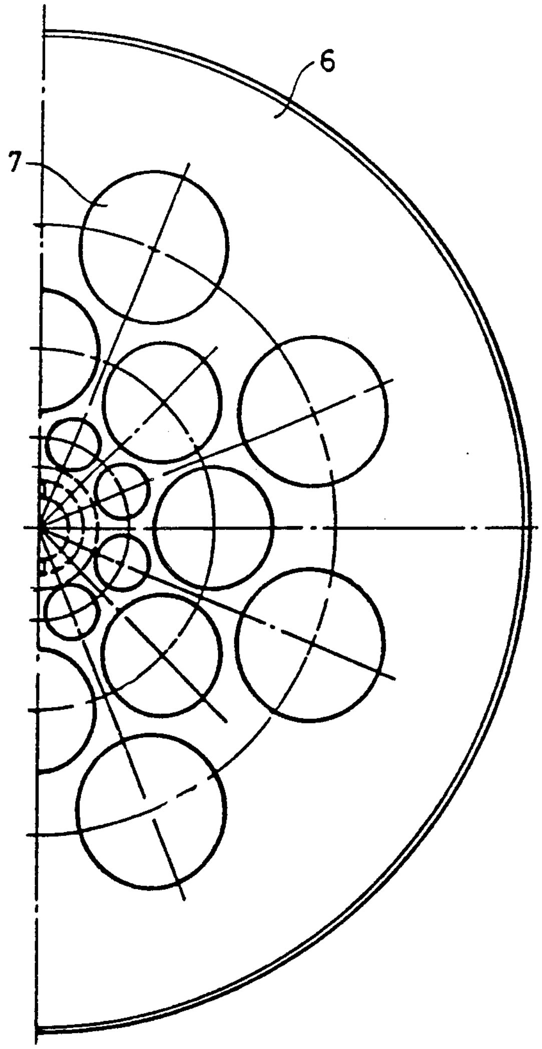

FIGS. 3a and 3b show an end disc 6 in which apertures 7 are disposed for the discharge of gas from the interior of the clamping roller for creating and maintaining a vacuum therein.

If a clamping roller of the type described above is used in an ink jet printing device, the clamping roller with a medium for printing fastened thereto, for example paper, is set in rotation, while the ink jet element is moved along said clamping roller parallel to the shaft thereof with programmed release of ink droplets. The vacuum inside the clamping roller was brought about in an experiment using fans which were set in such a way that in a drum on which no paper was placed in partial vacuum of 20 mm water column was found, while with complete covering of the roller using a sheet of paper of A0 format a partial vacuum of 21 mm water column was found.

The indentation of the clamping roller of the type indicated above which is covered with A0 format paper is at most 0.15 mm. The image deformation obtained through such an indentation is negligible.

What is claimed is:

1. A clamping roller for a sheet-like medium comprising:

a shaft;

a cylindrical element centered around said shaft, the surface of said cylindrical element being provided with perforations for holding said medium by suction, said cylindrical element comprising a thin-walled, seamless, perforated metal sleeve;

said metal sleeve having a patterned covering which has surface parts having at least one perforation, said covering being formed so that the format of the largest continuous surface part of said sleeve exposed substantially corresponds to the format of the smallest sheet-like medium to be clamped; and means for centering said sleeve around said shaft.

2. The roller of claim 1 wherein said covering is formed by:

coating said sleeve with a layer of light-sensitive composition;

exposing said layer to radiation of a suitable wavelength;

developing said layer with a developing fluid to remove the soluble parts of said layer; and, if necessary, hardening said layer to form said covering.

3. A clamping roller for a sheet-like medium comprising:

a shaft;

a cylindrical element centered around said shaft, the surface of said cylindrical element being provided with perforations for holding said medium through suction, said cylindrical element comprising a thin-walled, seamless, perforated metal sleeve;

means for centering said sleeve around said shaft, said centering means being end discs to which said sleeve is connected and which center said sleeve under axial tension relative to said shaft of said roller;

at least one end disc having at least one aperture which can connect to means for the discharge of gas to lower and maintain the pressure inside of said roller to less than atmospheric;

said means for discharge of gas being a stationary sleeve with restricted movement connected to one of said end discs so that free rotation of said roller is permitted.

4. In an ink jet printing device having a unit for programmed forming charging, and selective collection of droplets of printing medium, a clamping roller for accommodating a sheet-like medium for printing using said ink jet printing device, means for rotating said roller, and means for programmed movement of said ink jet printing device relative to said rotating clamping roller, the improvement comprising:

said clamping roller comprising:

a shaft;

a cylindrical element centered around said shaft, the surface of said cylindrical element being provided with perforations for holding said medium through suction, said cylindrical element comprising a thin-walled, seamless, perforated metal sleeve;

said metal sleeve having a patterned covering which exposes surface parts having at least one perforation, said covering being formed so that the format of the largest continuous surface part of said sleeve exposed substantially corresponds to the format of the smallest sheet-like medium to be clamped; and means for centering said sleeve around said shaft.

* * * * *